United States Patent
Yoshino et al.

(10) Patent No.: US 7,505,074 B2
(45) Date of Patent: Mar. 17, 2009

(54) IMAGE SENSING APPARATUS AND ITS CONTROL METHOD

(75) Inventors: Hiroaki Yoshino, Kanagawa (JP); Yoshinobu Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 886 days.

(21) Appl. No.: 10/831,326

(22) Filed: Apr. 26, 2004

(65) Prior Publication Data

US 2005/0174457 A1 Aug. 11, 2005

(30) Foreign Application Priority Data

Feb. 6, 2004 (JP) ............... 2004-031411

(51) Int. Cl.
*H04N 5/222* (2006.01)
*G09G 5/00* (2006.01)

(52) U.S. Cl. ................ 348/333.11; 345/667

(58) Field of Classification Search ............ 348/333.01, 348/333.11, 333.05, 333.12; 345/660, 667, 345/668, 669, 670, 671
See application file for complete search history.

(56) References Cited

U.S. PATENT DOCUMENTS

| | | | |
|---|---|---|---|
| 6,526,234 B1 * | 2/2003 | Malloy Desormeaux | 348/333.11 |
| 6,937,281 B1 * | 8/2005 | Ogawa | 348/333.11 |
| 2001/0010561 A1 * | 8/2001 | Nagai | 348/333.03 |
| 2004/0085470 A1 * | 5/2004 | Miyashita | 348/333.11 |
| 2004/0141082 A1 * | 7/2004 | Nakahira | 348/333.01 |
| 2004/0239792 A1 * | 12/2004 | Shibutani et al. | 348/333.12 |
| 2005/0094034 A1 * | 5/2005 | Bhatia et al. | 348/441 |
| 2007/0103578 A1 * | 5/2007 | Fredlund et al. | 348/333.11 |

FOREIGN PATENT DOCUMENTS

| | | |
|---|---|---|
| JP | 10-336494 | 12/1998 |
| JP | 2001186386 A * | 7/2001 |
| JP | 2003-87715 | 3/2003 |
| JP | 2003-87716 | 3/2003 |

OTHER PUBLICATIONS

U.S. Appl. No. 10/712,012, filed Nov. 14, 2003, Y. Sato.
U.S. Appl. No. 10/661,553, filed Sep. 15, 2003, Y. Sato.

* cited by examiner

*Primary Examiner*—Tuan V Ho
*Assistant Examiner*—Jason Whipkey
(74) *Attorney, Agent, or Firm*—Fitzpatrick, Cella, Harper & Scinto

(57) ABSTRACT

In an initial stage where an image obtained by image sensing is displayed, image data in a resolution depending on an image display area of display unit is displayed, thereby a high response can be maintained with respect to a request to display a next image or the like. Further, if a request with an enlargement ratio higher than that in the initial stage has been made, a display image is generated based on image data in a high resolution, thereby a user's request for enlarged display or the like can be fulfilled. When an image (JPEG file) stored in a recording medium is to be displayed, low resolution image data in 640×480 pixel size equivalent to the resolution of the display unit and high resolution image data in an original high resolution indicated with the image file are generated. In the initial stage, the low resolution image data is displayed. If an enlargement request has been made, partial image data cut out from the high resolution image data is resized and is displayed.

11 Claims, 12 Drawing Sheets

F I G. 10
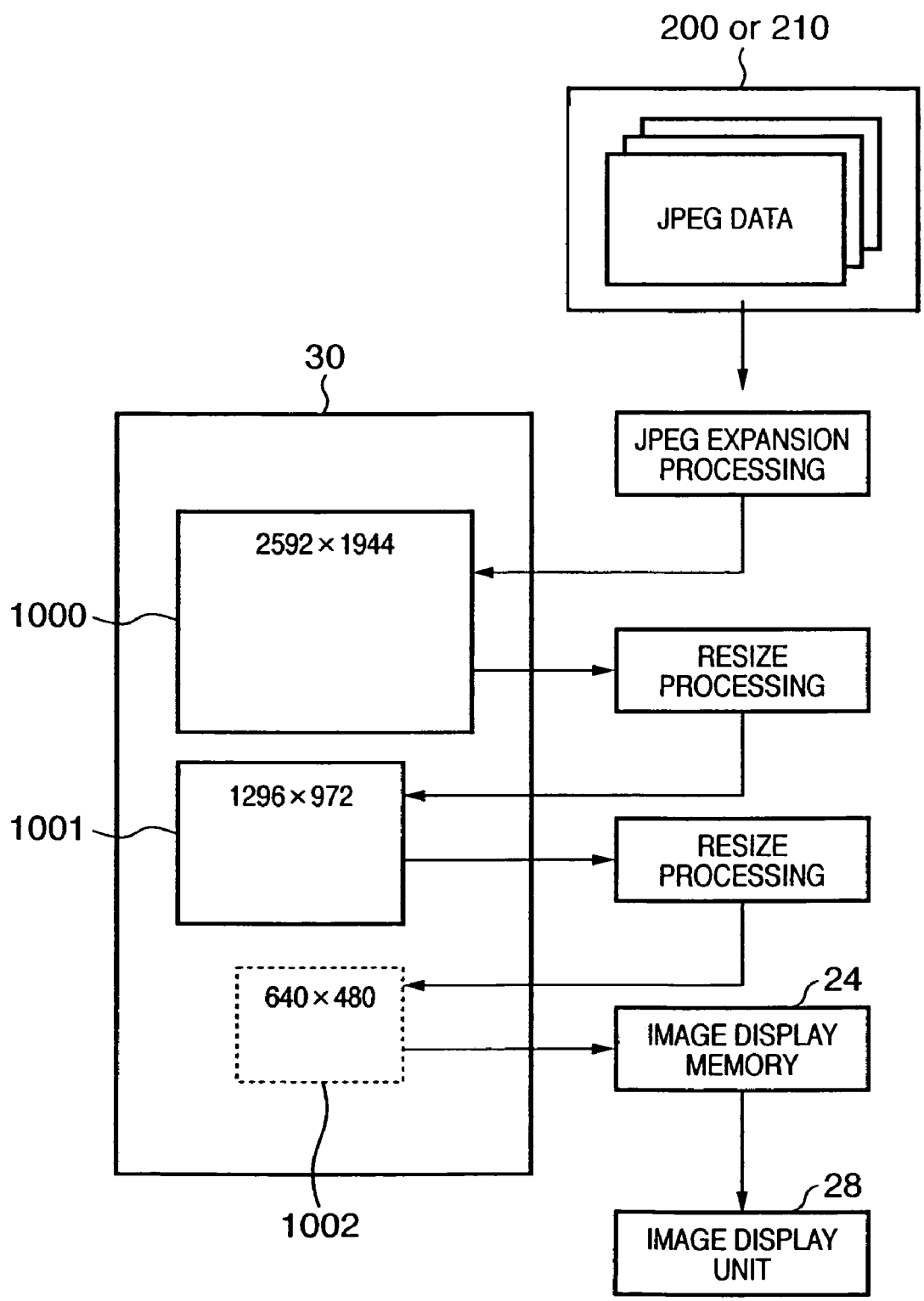

IMAGE SENSING APPARATUS AND ITS CONTROL METHOD

FIELD OF THE INVENTION

The present invention relates to a technique of displaying an image obtained by image sensing in an image sensing apparatus such as a digital camera.

BACKGROUND OF THE INVENTION

Recently, digital cameras are rapidly pluralized. Generally, the digital cameras have a display unit such as a liquid crystal display to reproduce a video image being image-sensed or already recorded in a storage medium such as a memory card, and an image which has been obtained can be checked on the spot of image sensing. This is one of the factors of the popularity. In addition, obtained images can be deleted in accordance with necessity. Further, the number of image sensing pixels has been increased to several millions to attain image quality equivalent to that obtained by a silver-salt camera. These facts may other factors of the popularity.

As described above, in many digital cameras, it is possible to display images stored in a storage medium (generally JPEG coded) on a display unit one by one. Further, some digital cameras have an attitude sensor such that the attitude upon image sensing, i.e., information on portrait image sensing or landscape image sensing is stored. Upon display of obtained image, the decoded image data is rotated in accordance with the information, and an image in an erect position is displayed on the display unit.

As the display unit, the liquid crystal display has a display capability of at most 640×480 dots which is far less than the resolution of images stored in the storage medium. Accordingly, processing upon display of stored image on the display unit includes reading a JPEG file from the storage medium, decoding, and thinning, to attain the 640×480 dot display resolution.

During the image display, it is also possible to enlarge a desired part of the display image (e.g., Japanese Patent Application Laid-Open No. 10-336494). Further, known is a technique of storing images in two different resolutions and displaying a low resolution image for checking, thereby improving the response to frame advance (Japanese Patent Application Laid-Open Nos. 2003-087715 and 2003-087716).

Assume that a digital camera has a frame advance function of sequentially displaying images, a function of enlarging an image part, and an image rotating function. That is, in this case, a user's requests include at least a frame advance (reverse) request, an enlargement request, and a rotation request.

According to Japanese Patent Application Laid-Open Nos. 2003-087715 and 2003-087716, as two images in different resolutions are stored and a low resolution image is displayed for checking, a high response can be expected in frame advance, however, the amount of consumption of recording medium is increased and then inevitably the number of storable images is limited. Further, in this art, image enlargement and rotation with enlargement cannot be handled.

Further, as the number of pixels of low resolution images is far smaller than the number of pixels of the liquid crystal display, to produce a display in correspondence with the resolution of the liquid crystal display, enlargement processing must be performed. As a result, the user checks merely a rough image.

Further, to effectively utilize the resolution of the liquid crystal display, an original image in a high resolution may be processed and displayed. In this case, if the rotation request has been made in correspondence with the image sensing attitude, as the original image must be rotate-processed, it takes time to display a rotated image.

SUMMARY OF THE INVENTION

The present invention has been made in consideration of the above situation, and provides a technique to maintain a high response in image reproduction at least with respect to a frequently-made request, while effectively utilize a recording medium.

According to the present invention, provided is an image sensing apparatus having image sensing means, display means for displaying image data obtained by image sensing, and request input means, which encodes the image data and stores the image data into a predetermined recording medium, where the apparatus comprises storage means for temporarily storing image data, decoding means for, in correspondence with a display request from the request input means, decoding coded image data stored in the recording medium, generating at least image data in a first resolution depending on a display resolution of an image display area of the display means and image data in second resolution higher than the first resolution, and storing the image data into the storage means, first display control means for, in an initial stage of the display request from the request input means and in a stage where the display request in the same enlargement ratio as that in the initial stage has been made, producing a display based on the image data in the first resolution; and second display control means for, if a request with an enlargement ratio higher than that in the initial stage has been made, cutting out an image in an area to be displayed from the image data in the second resolution, generating an image depending on the display resolution of the image display area of the display means, and displaying the image on the display means.

Further, the apparatus further comprises selection determination means for determining whether or not a selection request to change an image to be displayed has been made from the request input means, wherein if the selection determination means determines that the selection request has been made, the decoding means decodes another image data stored in the recording medium.

Further, the apparatus further comprises rotation request determination means for determining whether or not a rotation request has been made from the request input means, first rotated image display control means for, if the rotation request determination means determines that the rotation request has been made and the enlargement ratio upon the request is the same as that in the initial stage, generating display image data by rotation processing based on the image data in the first resolution, and displaying the display image data on the display mean, and second rotated image display control means for, if the rotation request determination means determines that the rotation request has been made and the enlargement ratio upon the request is higher than that in the initial stage, generating display image data by rotation processing based on the image data in the second resolution, and displaying the display image data on the display means.

Further, the apparatus further comprises attitude detection means for detecting an attitude of the image sensing apparatus upon image sensing, and addition means for adding attitude information to the image data based on an output from the attitude detection means, wherein the rotation request determination means automatically determines the rotation request based on the attitude information added by the addition means.

Further, if an enlargement request is made from the request input means when the display image data, rotate-processed based on the image data in the first resolution, is displayed on the display means by the first rotated image display control means, display image data is generated by rotation processing based on the image data in the second resolution.

Further, the apparatus further comprises scroll determination means for determining whether or not a scroll request has been made from the request input means, and scroll control means for, if the scroll determination means determines that the scroll request has been made and the enlargement ratio upon the request is the same as that in the initial stage, ignoring the request, while if the scroll determination means determines that the scroll request has been made and the enlargement ration upon the request is higher than that in the initial stage, generating scrolled image data based on the image data in the second resolution, and displaying the image data on the display means.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is an explanatory view showing an operation upon image decoding according to a second embodiment of the present invention;

DETAILED DESCRIPTION OF THE PREFERRED EMBODIMENTS

Hereinbelow, preferred embodiments of the present invention will now be described in detail in accordance with the accompanying-drawings.

Figure 1:
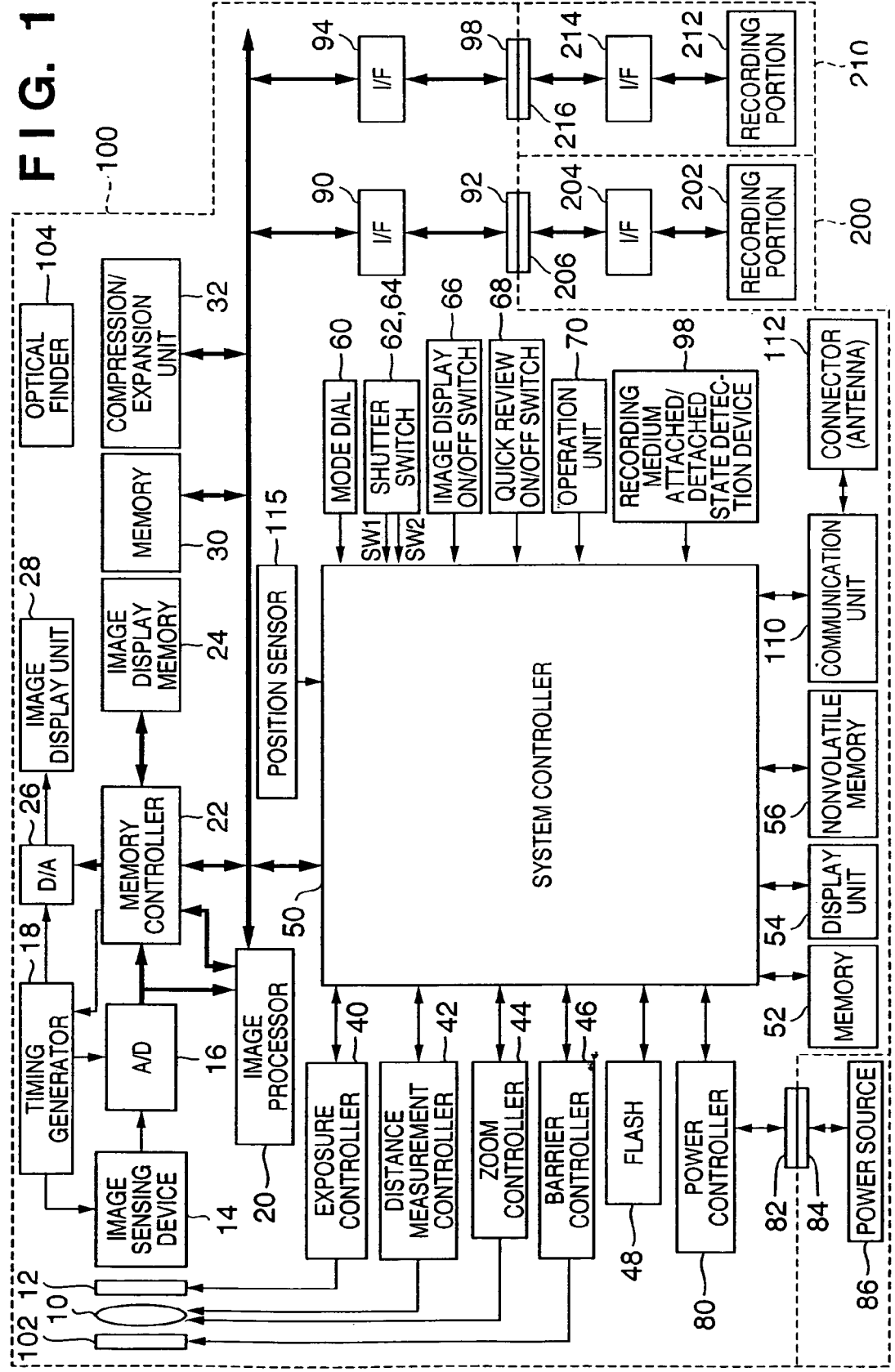
FIG. 1 is a block diagram showing the construction of a digital camera according to a first embodiment of the present invention.

FIG. 1 is a block diagram showing the construction of a digital camera according to a first embodiment of the present invention.

In FIG. 1, reference numeral 10 denotes an image sensing lens; 12, a shutter having a diaphragm function; 14, an image sensing device to convert an optical image to an electric signal; and 16, an A/D converter to convert an analog signal output from the image sensing device 14 to a digital signal.

Numeral 18 denotes a timing generator to supply a clock signal and a control signal to the image sensing device 14, the A/D converter 16 and a A/D converter 26. The timing generator 18 is controlled by a memory controller 22 and a system controller 50. Note that the image sensing device 14 in the present embodiment has a resolution of about 5,000,000 pixels.

Numeral 20 denotes an image processor to perform predetermined pixel interpolation processing and color conversion processing on data from the A/D converter 16 or data from the memory controller 22.

Further, the image processor 20 performs predetermined computation processing using image data obtained by image sensing, and based on the obtained computation result, the system controller 50 performs TTL (through the lens) AF (auto focus) processing, AE (automatic exposure) processing, and EF (Flash pre-light emission) processing by exposure controller 40 and distance measurement controller 42.

Further, the image processor 20 performs predetermined computation processing using image data obtained by image sensing, and performs TTL AWB (auto white balance) processing based on the obtained computation result.

The memory controller 22 controls the A/D converter 16, the timing generator 18, the image processor 20, an image display memory 24, the D/A converter 26, a memory 30, and a compression/expansion unit 32.

Data from the A/D converter 16 is written into the image display memory 24 or the memory 30 via the image processor 20 and the memory controller 22, otherwise, the data from the A/D converter 16 is directly written into the image display memory 24 or the memory 30 via the memory controller 22.

Numeral 28 denotes an image display unit comprised of a TFT LCD or the like. Image data for display, written in the image display memory 24, is displayed on the image display unit 28 via the D/A converter 26. Note that in the present embodiment, the image display unit 28 has a capability to display a 640×480 dot image, and the image display memory 24 functions as a VRAM for display on the image display unit 28. That is, the image display memory 24 has a capacity for 640×480 pixels.

An electronic finder function can be realized by sequentially displaying image data obtained by image sensing on the image display unit 28.

Further, in the image display unit 28, the display can be arbitrarily turned ON/OFF in accordance with an instruction from the system controller 50. If the display is turned OFF, its backlight (not shown) is also turned OFF, thus the electric consumption of the apparatus 100 can be greatly reduced.

The memory 30 is used for storing obtained still images and moving images. The memory 30 has a capacity sufficient for storing predetermined number of still images and predetermined period of moving images.

Even in continuous-shot image sensing of continuously obtaining plural still images or panoramic image sensing, high-speed and large-amount image writing can be performed in the memory 30.

Further, the memory 30 can also be used as a work area for the system controller 50.

The compression/expansion unit 32 compresses/expands image data by Adaptive Discrete Cosine Transform (ADCT) or the like. The compression/expansion unit 32 reads an image stored in the memory 30, performs compression processing or expansion processing and writes the processed data into the memory 30.

The exposure controller 40 controls the shutter 12 having a diaphragm function. The exposure controller 40 has a flash light control function in cooperation with a flash 48.

The distance measurement controller 42 controls focusing of the image sensing lens 10. Numeral 44 denotes a zoom controller to control zooming of the image sensing lens 10; and 46, a barrier controller to control the operation of a protector 102 as a barrier.

The flash 48 has an AF fill-light emission function and the flash light control function.

The exposure controller 40 and the distance measurement controller 42 are controlled based on the TTL method. The system controller 50 controls the exposure controller 40 and the distance measurement controller 42 based on the result of computation of image data, obtained by image sensing, by the image processor 20.

Numeral 52 denotes a computer-readable storage medium which holds constants, variables, programs and the like for the operation of the system controller 50.

Numeral 54 denotes a display unit with a liquid crystal display unit, a speaker and the like, to display operation statuses and messages with characters, images, sounds and the like in correspondence with execution of program by the system controller 50. The display unit 54 is provided in a single position or plural positions where visual checking can be easily made, around an operation unit of the image processing apparatus 100. The display unit is constituted with a combination of an LCD, an LED, sound emitting device and the like.

Further, a part of functions of the display unit 54 is set in an optical finder 104.

Among the display contents of the display unit 54, contents displayed on the LCD or the like are single-shot/continuous-shot image sensing, a self-timer, a compression ratio, the number of recording pixels, the number of recorded images, the number of recordable images, a shutter speed, an aperture value, exposure correction, flash, pink-eye effect mitigation, macro image sensing, a buzzer, a timer battery level, a battery level, an error, information by plural digits of numeric characters, an attached/detached status of recording media 200 and 210, an communication I/F operation, date and time, and the like.

Further, among the display contents of the display unit 54, contents to be displayed in the optical finder 104 include a focus status, a camera shake alert, a flash charge status, the shutter speed, the aperture value, the exposure correction and the like.

Numeral 56 denotes an electrically erasable and writable nonvolatile memory such as an EEPROM.

Numerals 60, 62, 64, 66, 68 and 70 denote operation means to input various operation requests to the system controller 50, comprised of a switch, a dial, a touch panel, pointing by visual-line detection, or a voice recognition device, or combination thereof.

Next, these operation means will be specifically described.

Numeral 60 denotes a mode dial switch to select power off, an auto image sensing mode, an image sensing mode, a panoramic image sensing mode, a reproduction mode, a multi-image reproduction/deletion mode, or a PC connection mode.

Numerals 62 and 64 denote shutter switches. The shutter switch 62 becomes ON when a shutter button (not shown) is half-depressed. The shutter switch 64 becomes ON when the shutter button is completely depressed.

When the shutter switch 62 becomes ON, the AF (auto focus) processing, the AE (auto exposure) processing, the AWB (auto white balance) processing, the EF (flash pre-light emission) processing and the like are started.

Further, when the shutter switch 64 becomes ON, exposure processing to write a signal read from the image sensing device 12 via the A/D converter 16 and the memory controller 22, development processing using calculation by the image processor 20 and the memory controller 22, and recording processing to read image data from the memory 30 then perform compression by the compression/expansion unit 32 and write the image data into the recording medium 200 or 210, are performed.

Numeral 66 denotes an image display ON/OFF switch to set an ON/OFF state of the image display unit 28. When the display of the image display unit 28 is turned OFF, its backlight is turned off. Upon image sensing by using the optical finder 104, as electric-current supply to the image display unit comprised of a TFT LCD or the like is stopped by this function, electric power can be saved.

Numeral 68 denotes a quick review ON/OFF switch to set a quick review function of automatically reproducing obtained image data immediately after image sensing. Note that in the present embodiment, the quick review function can be set particularly in a case where the image display unit 28 is turned OFF.

Numeral 70 denotes an operation unit having various buttons, a touch panel and the like, provided with a menu button, a set button, a macro button, a multi-image reproduction/repaging button, a flush setting button, a single/continuous-shot/self-timer selection button, a menu move (+) button, a menu move (−) button, an image move (+) button, an image move (−) button, an image sensing quality selection button, an exposure correction button, a date/time setting button, and the like.

Numeral 80 denotes a power controller comprised of a battery detection circuit, a DC-DC converter, a switch circuit to select a block to be electrified, and the like. The power controller 80 detects a battery attached/detached state, the type of battery, the residual battery power amount. The power controller 80 controls the DC-DC converter based on the results of detection and an instruction from the system controller 50, and supplies a necessary voltage to respective parts including the recording medium for a necessary period.

Numeral 82 denotes a connector; 84, a connector; and 86, a power source comprised of a primary battery such as an alkali battery or a lithium battery, a secondary battery such as an NiCd battery, an NiMH battery or an Li battery, or an AC adapter.

Numerals 90 and 94 denote interfaces for recording media such as a memory card and a hard disk; 92 and 96, connectors for connection with the recording media such as a memory card and a hard disk; and 98, recording-medium attached/detached state detection means for detecting whether or not the recording medium 200 or 210 is attached to the connector 92 or 96.

Note that in the present embodiment, the apparatus has two systems of interfaces and connectors for attachment of recording medium. The number of systems of interfaces and connectors is not limited two, but the apparatus may have single or plural systems of interfaces and connectors for attachment of recording medium. Further, interfaces and connectors in conformity with different standards may be combined.

As the interfaces and connectors, a PCMCIA card, a CF (compact flash) card and the like may be employed.

Further, in a case where the PCMCIA cards and CF (compact flash) cards are used as the interfaces 90 and 94 and the connectors 92 and 96, by connection with a communication card such as a LAN card or modem card, a USB card, an IEEE1394 card, a P1284 card, a SCSI card and a PHS card, image data and management information attached to the image data can be transferred between the apparatus and another computer and/or a peripheral device such as a printer.

The protector 102 is a barrier which covers an image sensing portion of the image processing apparatus 100 including the lens 10 thereby prevents contamination and breakage of the image sensing portion.

The optical finder 104 enables image sensing without use of the electronic finder function using the image display unit 28. Further, the part of functions of display unit 54, i.e., the display of the focus status, the camera shake alert, the flash charge status, the shutter speed, the aperture value, the exposure correction and the like, are set in the optical finder 104.

Numeral 110 denotes a communication unit having various communication functions for RS232C, USB, IEEE1394, P1284, SCSI, modem, LAN, radio communication and the like.

Numeral 112 denotes a connector for connection between the apparatus 100 with another device, or an antenna in the case of radio communication.

Numeral 115 denotes an attitude sensor to detect the attitude of the apparatus 100 comprised of a gravity sensor. The attitude sensor 115 detects the direction of image sensing in the case of portrait image sensing while the apparatus is held in a vertical position, in the case of landscape image sensing while the apparatus is held in a sideways position, or the like. The direction is added as attitude information to the header of image file as a result of image sensing.

The recording media 200 and 210 have a recording portion 202 comprised of a semiconductor memory or a magnetic disk, an interface 204 for interfacing between the medium and the image processing apparatus 100, and a connector 206 for connection with the image processing apparatus 100.

The construction of the digital camera (image sensing apparatus) of the present embodiment is as described above. Next, the operation according to the present embodiment will be described with reference to FIGS. 2 to 7.

Figure 2:
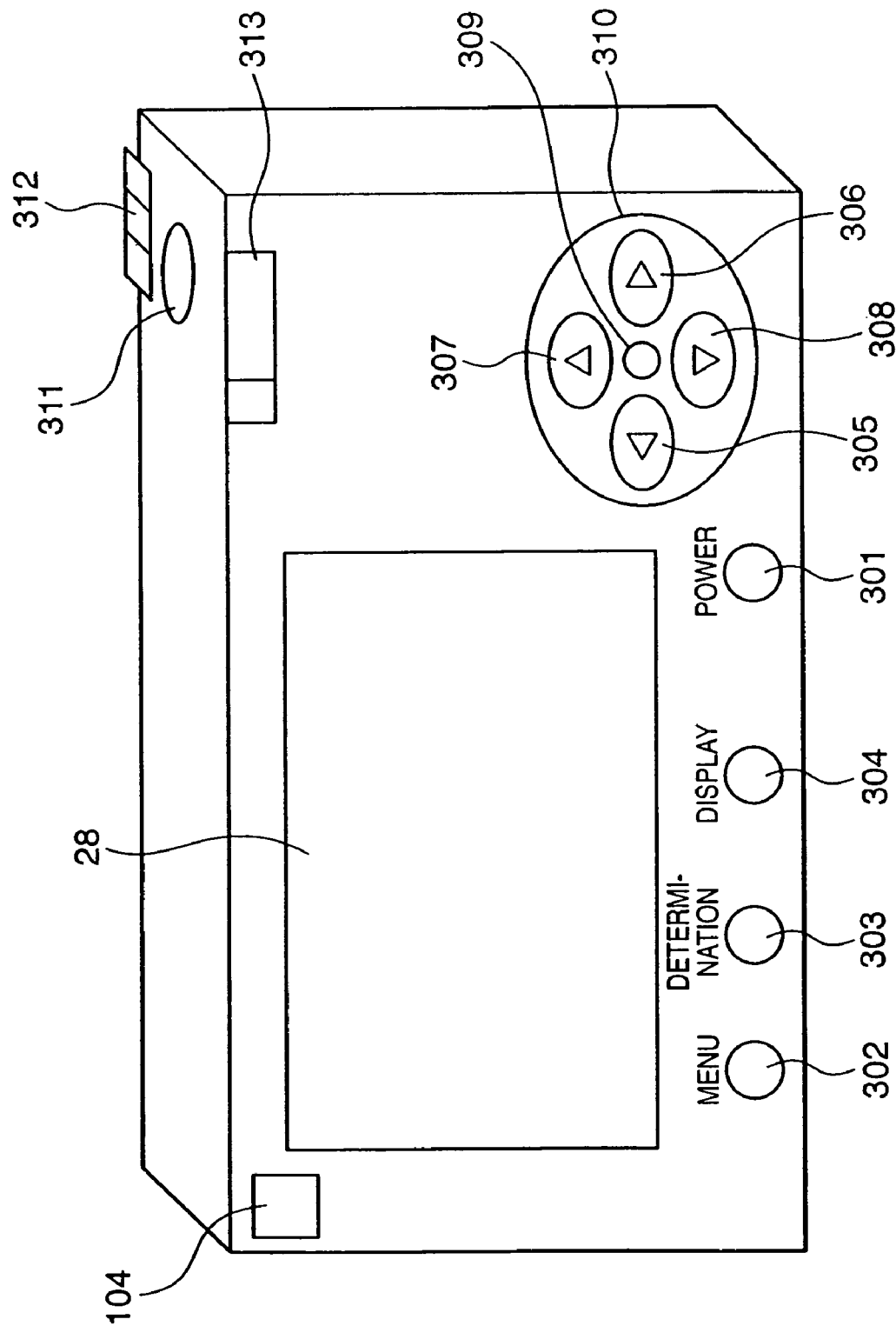
FIG. 2 is a perspective view showing a rear surface of the digital camera according to the first embodiment.

FIG. 2 is a perspective view showing a rear surface of a digital camera (image sensing apparatus) according to the present embodiment. In FIG. 2, numeral 301 denotes a power switch; 302, a menu key to display various menu items; 303, a switch to determine a selected menu item; and 304, a key to change the ON/ON status of the image display unit 28. Numerals 305 and 306 denote left and right switches; and 307 and 308, up and down switches. These switches are integral with an operation disk 310. In accordance with the inclination of the operation disk 310 when depressed, one of these switches is turned ON. Further, a switch 319 is provided in the central position of the operation disk 310. Thus 5 types of inputs can be made in accordance with situation. When the menu is displayed on the image display unit 28, the operation disk 310 functions as a direction key to select a menu item, and in the case of the reproduction mode to be described later, the operation disk 310 is used for image display control (to be described in detail later).

Numeral 311 denotes a shutter button; 312, an enlargement/compression key which functions as a key to control optical zooming in the case of the image sensing mode and which functions as a key to designate enlargement/compression of reproduced image in the case of the reproduction mode; 313, a mode selection key to select the image sensing mode (an image obtained by image sensing is written into a storage medium upon depression of the shutter button 311) or the reproduction mode (an image stored in the storage medium 200/210 is displayed on the image display unit 28).

When the image sensing mode is set with the mode selection key 313, the enlargement/compression key 312 is operated in accordance with necessity to set a zooming scale factor. When the shutter button 311 is depressed, the AE processing and the like are performed as described above, then an image obtained by image sensing is stored in the memory 30, then JPEG coding is performed, and the image data is written into the recording medium 200 or 210. At this time, the result of detection with the attitude sensor 115 is added to the header of the image file. Note that as the processing in the image sensing mode is not a main part of the present invention, the explanation of the processing will be omitted, and processing in a case where the reproduction mode is set with the mode selection key 313 will be described.

When the reproduction mode is set, a head image is read from the recording medium 200 or the like, then decoding processing is performed on the image, then a display image is mapped in the image display memory 24, and the image is displayed on the image display unit 28. At this time, the respective switches 305 to 309 of the operation disk 310 and the enlargement/compression key 312 perform the following functions.

In a state immediately after an image has been displayed on the image display unit 28, or a state where the displayed image is displayed in same-size scaling left switch 305: frame reverse (key to instruct to display a previous image)

right switch 306: frame advance (key to instruct to display a next image)

up and down switches 307 and 308: (no function)

central switch 309: rotation key (to rotate counterclockwise 90° upon each depression)

enlargement/compression key 312: key to control scaling of display image

In a state where a display is produced in scaling other than the same-size scaling with the enlargement/compression key 312 up, down, left and right keys 305 to 308: image scroll in the respective directions enlargement/compression key 312: key to control scaling of display image central switch 309: rotation key In the above example, the functions of the keys are changed in accordance with situation, however, independent switches having the respective functions may be provided. Further, in the state where an image is displayed in scaling greater than the same-size display with the enlargement/compression key 312, "scroll" means to shift (move) a displayed part of the image in a two-dimensional manner to display a desired part.

Hereinbelow, the details in the reproduction mode according to the present embodiment will be described.

As described above, the image sensing device 14 of the digital camera has a resolution of 5,000,000 pixels. That is, the image sensing device has a capability to obtain a 2592× 1944 pixel image. The image of this resolution is JPEG-encoded and stored in the recording medium 200 or the like. On the other hand, the image display unit 28 as a viewer has 640×480 pixels.

As described above, the header of image file has rotational angle information upon reproduction based on the attitude of image sensing. Accordingly, in the reproduction mode, an image obtained by landscape image sensing is finally stored as a 640×480 pixel image in the image display memory 24 and is displayed. Further, an image obtained by portrait image sensing is rotate-processed and stored as a 360×480 pixel image and is displayed.

On the user side, a state where the entire image is displayed on the image display unit 28 is recognized as a "same-size" display, and a state where the scaling is increased is recognized as an "enlarged" display.

However, on the apparatus side, i.e., on the system controller 50 side, the image displayed on the image display unit 28 corresponds to compression processing. Upon same-size display, a 640×480 area is cut out from the entire 2592×1944 area and mapped in the image display memory 24. This corresponds to maximum scaling for the user. To avoid complication of explanation, the scaling on the user side will be used.

In the present embodiment, image rotation processing is performed at 2 timings. In a case where rotation information is included in the header of an image obtained by image sensing and the image with requirement of rotation is initially displayed, the image rotation processing is performed. Further, the rotation processing is performed in accordance with a rotation request by the user's turning the switch 309 of the operation disk 310 ON during reproduction display.

Note that the processing to convert a 2592×1944 pixel image to a 640×480 pixel image may be simple thinning (or filtering) processing which can be easily realized with hardware. The time for the processing can be almost ignorable. Accordingly, even in a case where the user has requested enlargement with the enlargement/compression key 312 without rotation, an image as a result of request can be generated and displayed in a quick manner.

However, the reproduction of an image obtained by portrait image sensing (a 2592×1944 pixel image) is accompanied by the rotation processing. The rotation processing is basically exchanging pixel values represented as x- and y-coordinates. If the size of image to be rotated is 5,000,000 pixels as in the present embodiment, much time is required for the processing.

In the reproduction mode, in the case of frame advance/reverse operation, the response is high in sequential image display without rotation processing. However, in this case, if an image requiring the rotation processing exists, it takes several seconds before the image is displayed, thus the response is degraded.

Next, a countermeasure against the above problem according to the present embodiment will be described.

Figure 3:
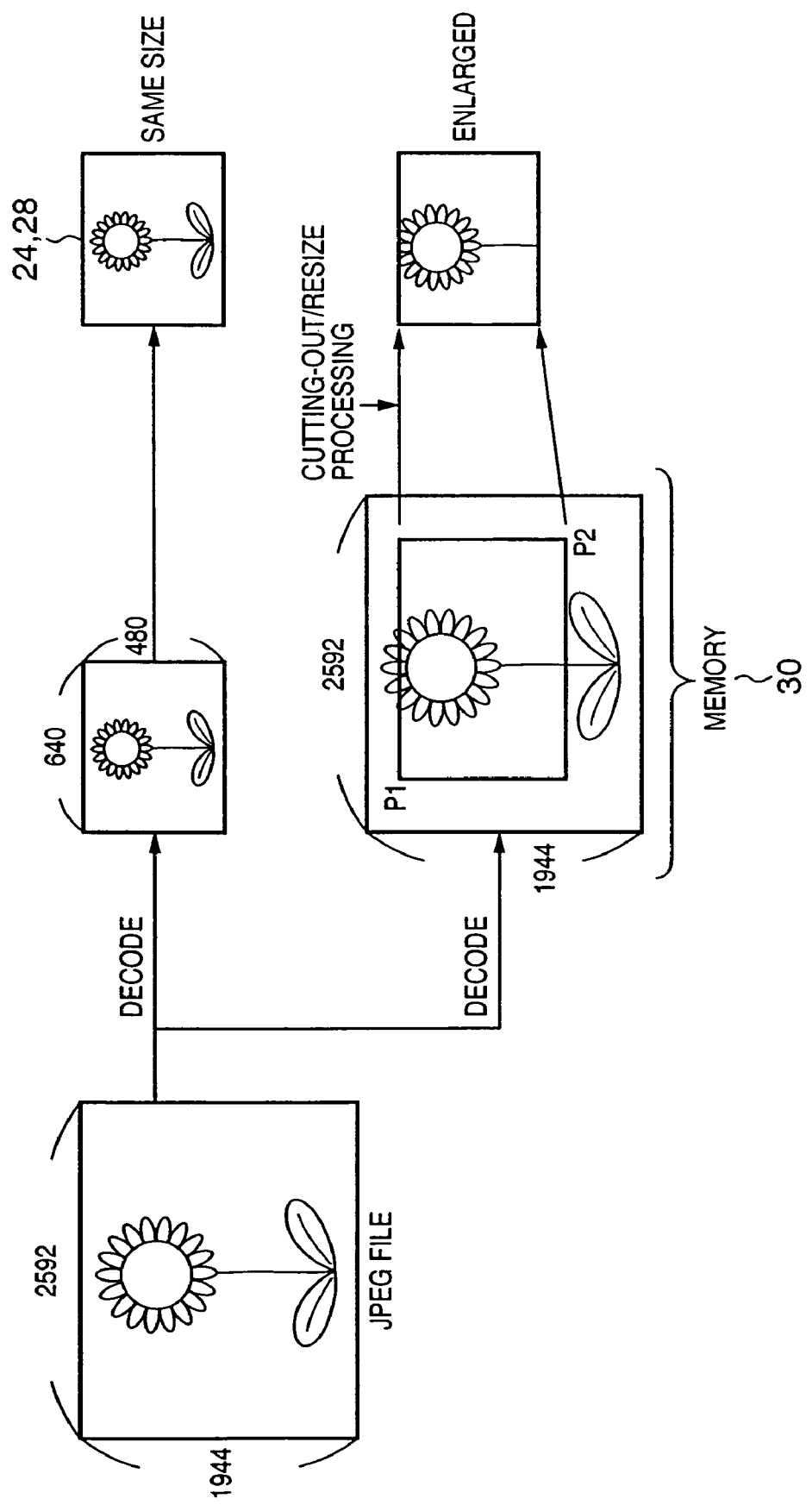
FIG. 3 is an explanatory view showing the contents of display processing upon same-size displaying and enlarged displaying according to the first embodiment.

FIG. 3 shows the flow of image data processing. In FIG. 3, an image file to be reproduced (in the present embodiment, a JPEG file in 2592×1944 pixel size) is decoded, and image data in the 640×480 pixel size, corresponding to the resolution of the image display unit 28 (low resolution image data or a small size image data), and 2592×1944 pixel original image data (high resolution image data or a large sized image data) are mapped in the memory 30. In the initial stage of reproduction (the scaling for the user is same-size), the low resolution image data is transferred to the image display memory 24 and is displayed.

Figure 4:
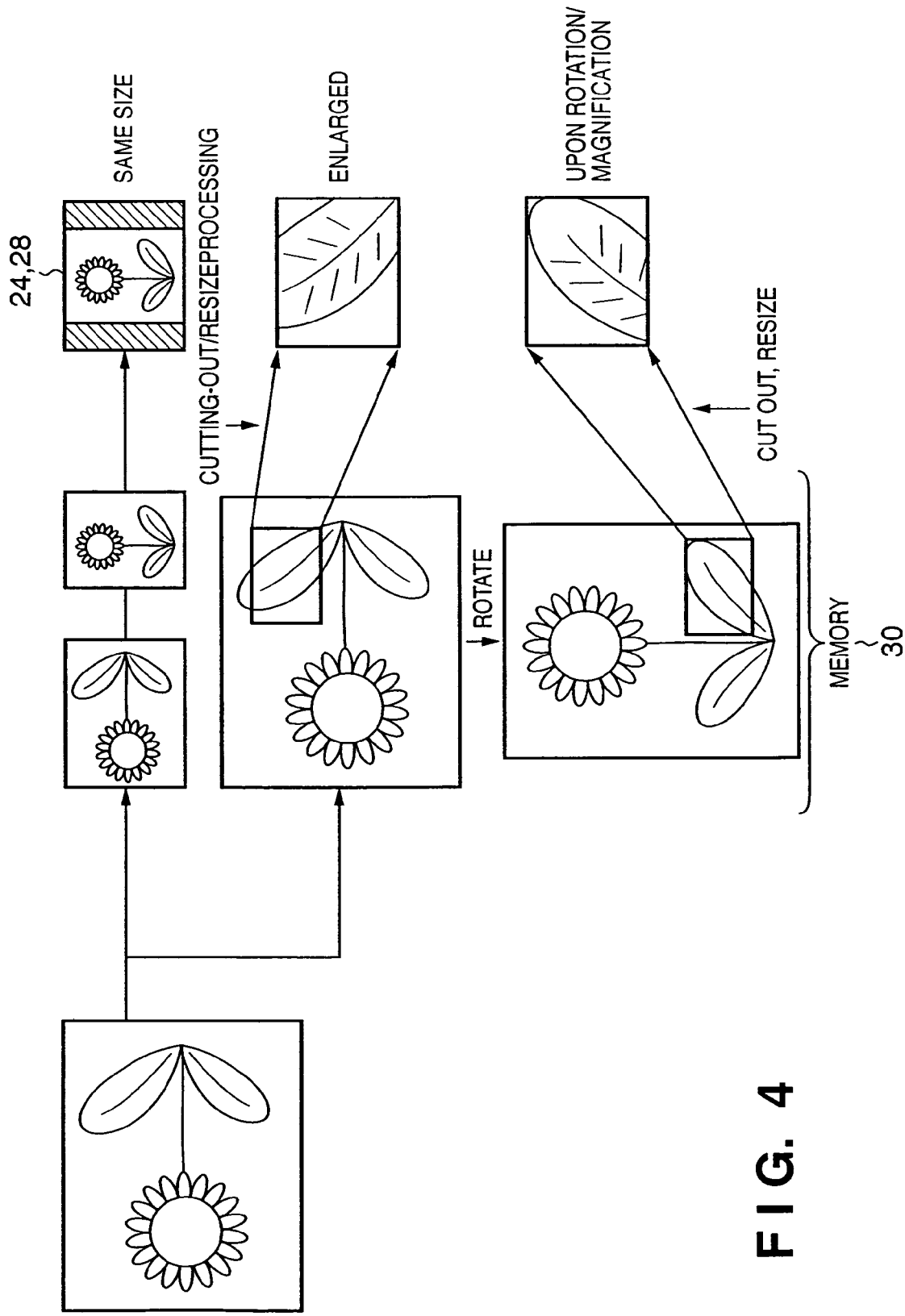
FIG. 4 is an explanatory view showing the contents of the display processing on an image to be rotated upon same-size displaying and enlarged displaying, according to the first embodiment.

Further, as shown in FIG. 4, if an image to be reproduced requires rotation, first, 640×480 pixel low resolution image data and high resolution image data are generated in the memory 30. Then the low resolution image data is rotate-processed, then further compressed to the 360×480 pixel size, then transferred to the image display memory 24 and is displayed.

That is, in a case where only the left switch 305 and the right switch 306 of the operation disk 310 are operated to sequentially display images, low resolution image data are utilized as shown in FIGS. 3 and 4. As a result, regarding the frame advance/reverse operation with high frequency of use, image display updating can be performed without user discomfort.

On the other hand, in a case where an image is displayed and when the image is rotated, if a scaling designated from the user is same-size scaling, low resolution image data is rotated, and the data with the size of 640×480 pixels or 360×480 pixels is generated upon each rotation, then transferred to the image display memory 24 and is displayed.

As shown in FIG. 3, if the designated scaling is greater than the same-size scaling, a rectangular area defined with an upper-left corner position P1 and a lower right corner position P2 is cut out from high resolution image data. Then image data, resized to 640×480 pixels, is generated in the memory 30, then transferred to the image display memory 24 and is displayed. The points P1 and P2 are determined in dependence on a scroll request and a scaling designated by the user. Accordingly, as the enlargement ratio designated by the user is smaller, the size of cut-out area is larger, on the other hand, as the enlargement ratio designated by the user is larger, the size of cut-out area is smaller.

Further, in a case where rotation is requested while the scaling designated by the user is greater than the same-size scaling, high resolution image data is rotate-processed in accordance with a rotation angle corresponding to the rotation request. The rotated high resolution image data is overwritten in the memory 24. When the rotation processing has been completed, an area defined with the cut out positions P1 and P2 is cut out, then the image, resized to 640×480 pixels corresponding to the display resolution of the image display unit 28, is generated in the memory 30, then transferred to the image display memory 24 and is displayed.

Further, upon reception of scroll request, merely the cut out positions P1 and P2 of the current (rotated) high resolution image data are changed and the cut-out processing and the resize processing are performed. Accordingly, the high response can be maintained.

As described above, in the present embodiment, if rotation is requested during image display in scaling greater than same-size scaling, high resolution image data is rotate-processed. Although the response is degraded, however, a high response can be obtained in other operations.

Generally, in the reproduction mode, the user frequently makes the frame advance and frame reverse requests. The enlargement and scroll may be continuously performed, however, it is very rare that enlargement in rotated state or rotation in enlarged state is continuously requested. In this point, according to the present embodiment, as a high response can be expected in the high-frequency operations, the entire operation environment can be agile.

Note that in the present embodiment, the high resolution image data is the original 2592×1944 pixel data, however, the pixel size is not limited to the above size. For example, image data of 1296×972 pixels, smaller than the original image data but larger than the lower resolution image data can be prepared as enlarged display image data. In an image sensing apparatus which generates extremely large original image data (e.g. 20,000,000 pixels) in comparison with the resolution of the image display unit 28, if image data smaller than the original image data is prepared, it can be used in enlarged display without using the original image without problem, and further, the display speed can be advantageous.

Next, a processing procedure according to the present embodiment will be described in accordance with the flowcharts of FIGS. 5 to 8. Note that the processing starts if the reproduction mode is set with the mode selection key 313 (See FIG. 2).

First, at step S1, a head file is selected from the recording medium 200 or 210. The selection is made from the oldest date and time of image sensing, however, the selection may be made on any other selection reference.

Next, at step S2, the selected file is read and decoded, and 640×480 pixel low resolution image data and 2592×1944 pixel high resolution image data are stored in the memory 30.

Next, at step S3, the enlargement ratio α is initialized to 1, a rotation angle β is initialized to 0, and a central position Q upon enlargement is initialized to a central position of image.

Next, at step S4, a header of the image of, interest is checked and it is determined whether or not a rotation angle is set. If NO (the rotation angle is zero), the process proceeds to step S5, at which the low resolution image data is transferred (actually, DMA transferred) to the image display memory 24 and is displayed on the image display unit 28.

Further, if portrait image sensing has been made, as information to rotate by 90° is added to the header, the process proceeds to step S6, at which the rotation angle is stored as the rotation angle β. Then at step S7, the low resolution image is rotated in accordance with the rotation angle β, the image is resized to 360×480 pixels. At step S8, the resized image is transferred (DMA transferred) to the image display memory 24 and is displayed on the image display unit 28.

Thereafter, at step S9, the user's input is waited. When an input has been made, the process proceeds to step S10, at which the type of input request is determined. If it is determined that the input request is a frame advance request, the next image file is selected at step S11, then the process returns to step S2 to perform the above processing. In a case where the frame advance request has been received while a last image file is reproduced, the head image file is selected. Further, in a case where the process returns to step S2, image data already stored in the memory 30 is deleted or overwriting is made on the data.

On the other hand, if it is determined at step S10 that the input request is a frame reverse request, a previous image file is selected at step S12, and the process returns to step S2. In a case where this request has been made when the head image file is reproduced, the last image file is selected.

Figure 6:
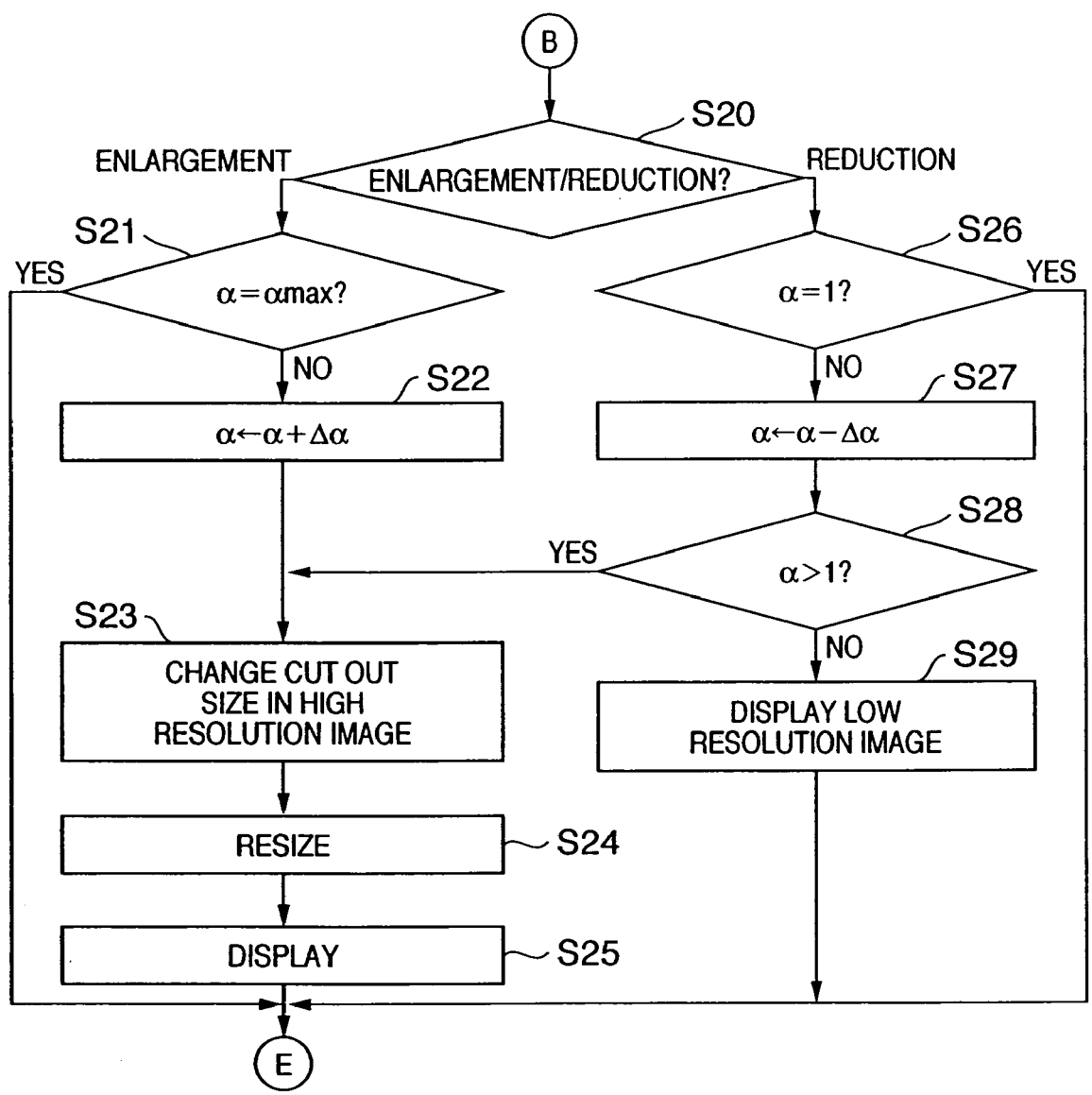

If it is determined at step S10 that the input request is an enlargement/compression request, the process proceeds to step S20 in FIG. 6.

Figure 5:
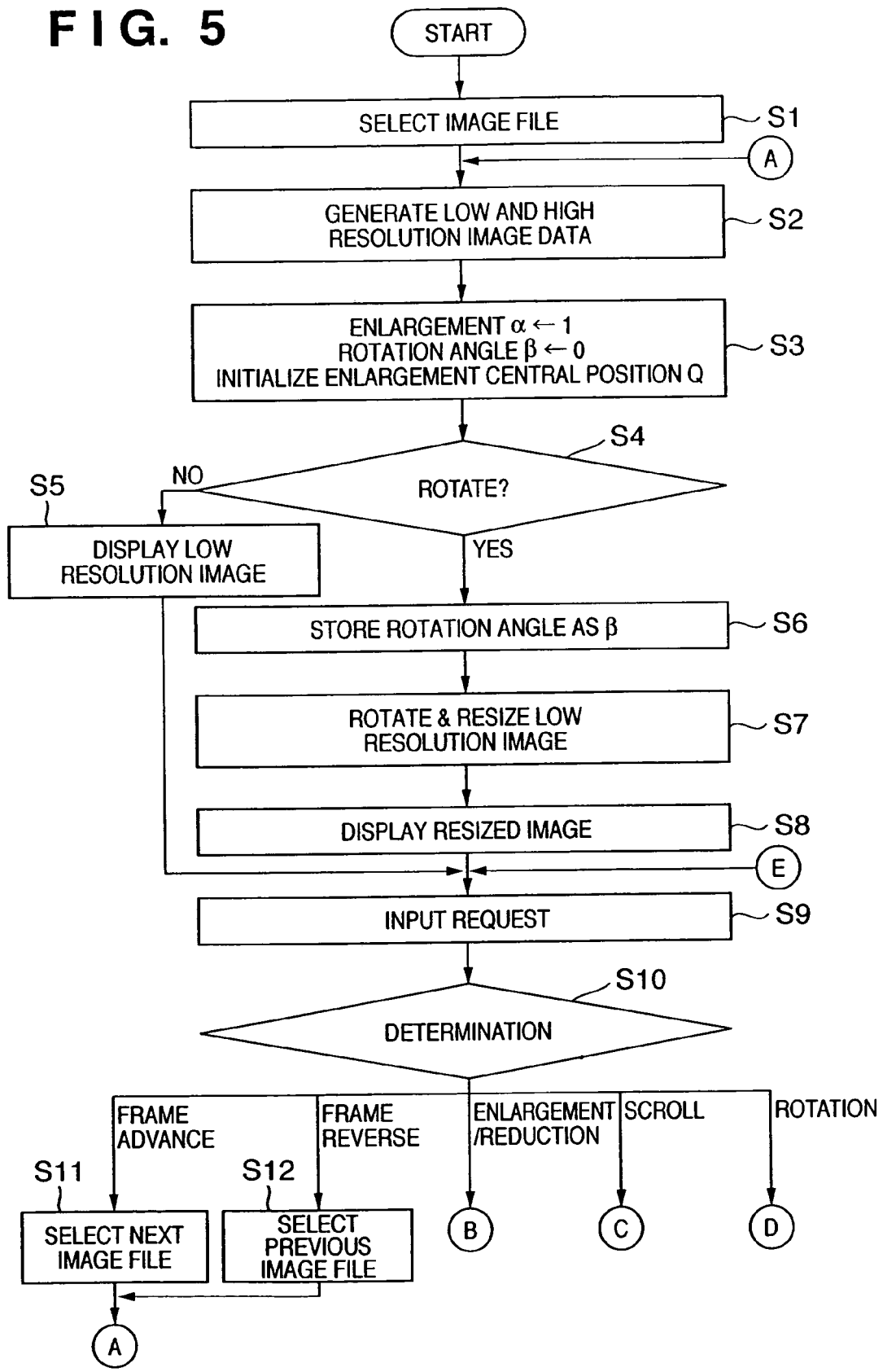
FIGS. 5 to 8 are flowcharts showing a processing procedure in an image reproduction mode according to the first embodiment.

First, at step S20, it is determined whether the request is an enlargement or compression request. If it is determined that the request is an enlargement request, the process proceeds to step S21, at which it is determined whether or not the current enlargement ratio α is a maximum scaling αmax. If it is determined that the current enlargement ratio is αmax, as further enlargement cannot be made, the request is ignored. The process returns to step S9 (FIG. 5).

Further, if it is determined that the current enlargement ratio α is lower than the maximum scaling αmax, the process proceeds to step S22, at which the scaling is increased by Δα (positive value). The value Δα may be any value. However, as the number of operations to display in the maximum scaling increases if a small value is used, the value is 25% in the present embodiment. As the resolution of the image display unit 28 is 640×480 pixels and that of the image sensing device is 2592×1944 pixels, the number of enlargement steps is 16.

When the enlargement ratio has been determined, the process proceeds to step S23, at which the cut out size from the high resolution image data is determined with the enlargement central position Q at that time. At step S24, the cut image is resized to 640×480 pixels, and at step S25, the resized image data is transferred to the image display memory 24 and is displayed, and the process returns to step S9.

Further, if it is determined at step S20 that the request is a compression request, the process proceeds to step S26, at which it is determined whether or not the current enlargement ratio α is "1", i.e., the same-size scaling. If the same-size scaling is set, as further compression cannot be performed (as there is no meaning), the processing in FIG. 6 ends, and the process returns to step S9.

Further, if it is determined that the current enlargement ratio α is greater than "1", the scaling is decreased by Δα at step S27. Then, as a result, if the enlargement ratio α has become "1", the process proceeds to step S29, at which the low resolution image data is transferred to the image display memory 24 and is displayed. Further, if it is determined that the updated enlargement ratio α is greater than "1", the process proceeds to step S23, to perform the above-described processing.

Figure 7:
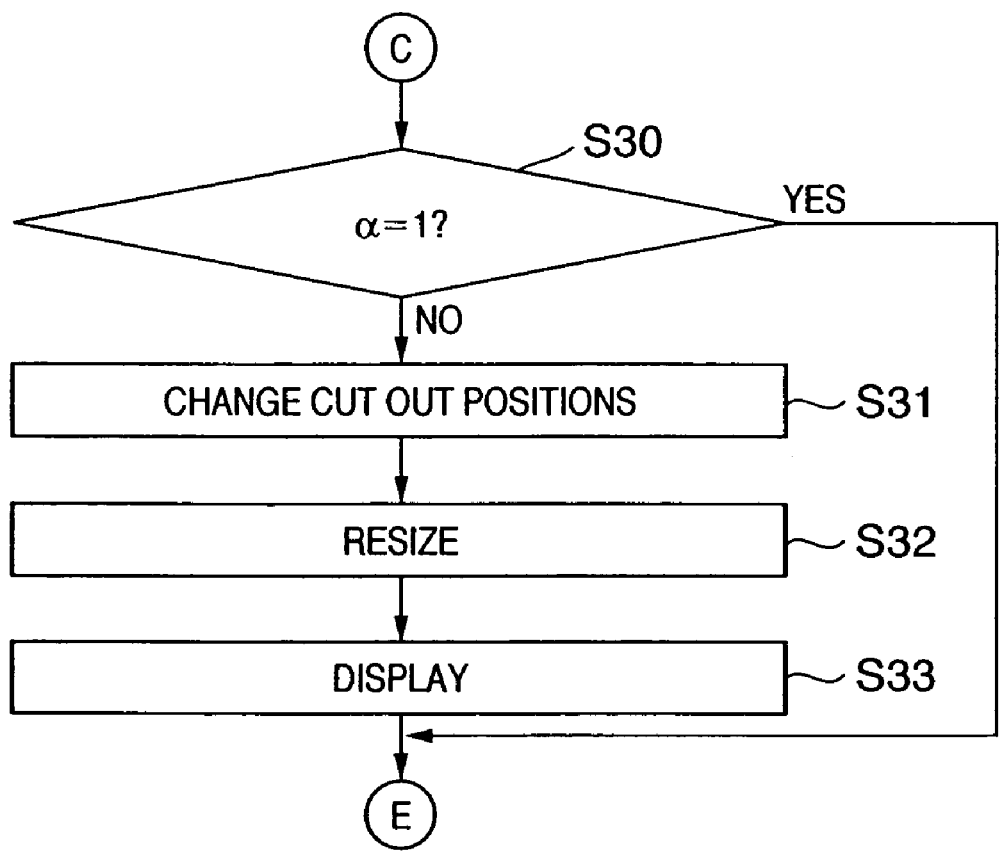

Next, processing in a case where it is determined (at step S10) that the request inputted at step S9 is a scroll request will be described with reference to the flowchart of FIG. 7.

When a scroll request has been made, first, at step S30, it is determined whether or not the enlargement ratio α is "same-size".

If it is the same-size scaling, the entire image, if it is a landscape image, of 640×480 pixels, is displayed on the full screen of the image display unit 28. If the image is a portrait image, the entire image of 360×480 pixels is displayed. In this case, scrolling has no meaning. Accordingly, it is determined that the scroll request is invalid, and this processing ends, and the process returns to step S9 in FIG. 5. Note that in the case of same-size display; when one of the switches 305 and 306 has been depressed, it is determined that frame advance or reverse has been designated. Accordingly, the scroll request in the case of same-size display is used with the up and down switches 307 and 308.

During enlarged display, when one of the switches 305 to 308 of the operation disk 310 has been operated, it is determined that a scroll request has been made. In this case, the process proceeds to step S31, at which the cut out positions (points P1 and P2 in FIG. 3) in the high resolution image data are changed by a predetermined amount in a designated direction. The predetermined amount may be any value. However, if it is a small value such as 1 pixel in a horizontal/vertical direction, the number of scrolling is large. Accordingly, it is preferable that the predetermined amount is about several ten pixels.

Note that the predetermined amount may be determined in correspondence with the enlargement ratio. Further, the points P1 and P2 in FIG. 3 are controlled not to run over the boundary of the high resolution image data.

When the cut out positions have been determined, the process proceeds to step S32, at which image data in the cut out positions is cut out, and resized to 640×480 pixels. At step S33, the image data is transferred to the image display memory 24 and is displayed. Then the process returns to step S9.

Figure 8:
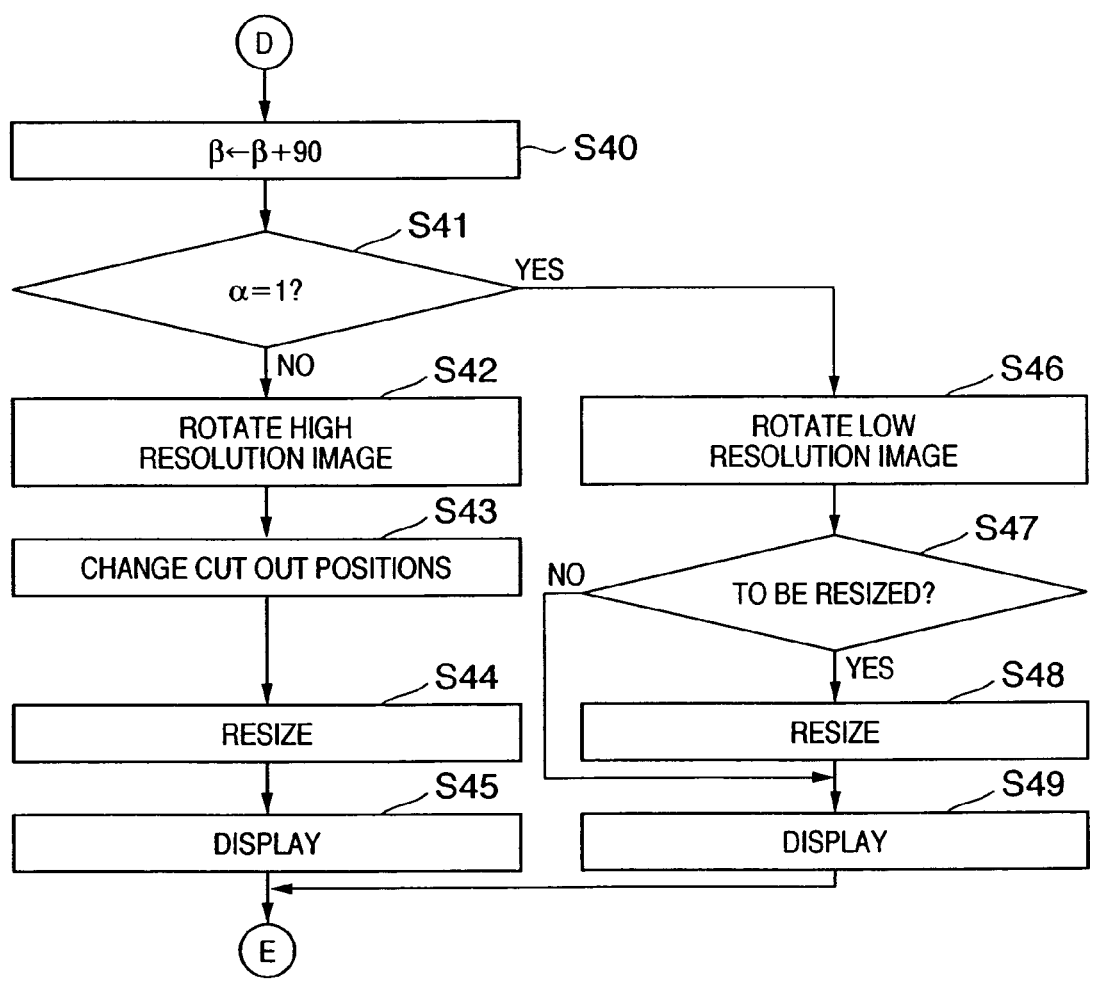

Next, processing in a case where it is determined (at step S10) that the request inputted at step S9 is a rotation request will be described with reference to the flowchart of FIG. 8.

First, at step S40, the rotation angle β is increased by 90°. That is, the rotation angle β is updated as 0→90→180→270→0.

Figure 9:
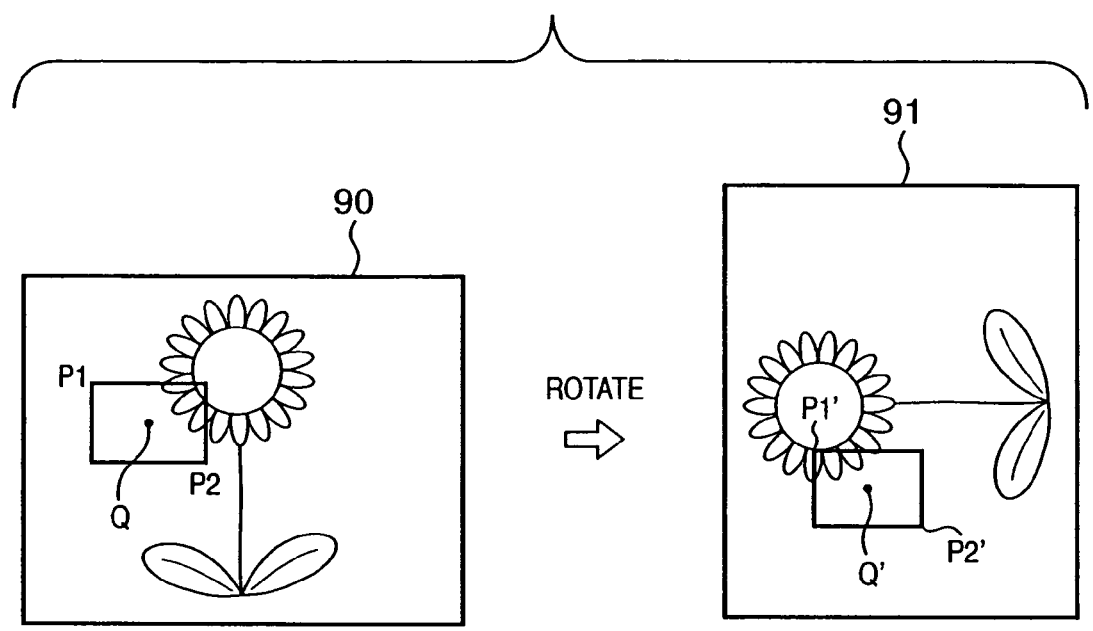
FIG. 9 is an explanatory view showing the contents of rotation processing upon enlarged image display.

Next, at step S41, it is determined whether or not the enlargement ratio α is "same-size". If it is determined that the enlargement ratio α is greater than the same-size scaling, the process proceeds to step S42, at which the high resolution image data is rotated by the rotation angle β from the initial state, and the result is stored in the memory 30. At this time, the high resolution data at the previous angle can be deleted or overwriting can be made on the data. At step S43, the cut out positions in the rotated high resolution image data are changed. For example, in FIG. 9, the current cut out area in high resolution image data 90 prior to rotation is an area defined with the points P1 and P2 with the enlargement central position Q (determined in accordance with scrolling) as the center. As the rotation is made by +90°, the rotated high resolution image data is as represented as data 91 in FIG. 9. As the coordinate position of the enlargement central position Q has been changed to Q' by the rotation, the cut out positions P1 and P2 have changed to P1' and P2'.

At step S44, an image defined with the new cut out positions is cut out, and resized to 640×480 pixels. At step S45, the resized image data is transferred to the image display memory 24 and is displayed on the image display unit 28. Then the process returns to step S9 in FIG. 5.

Further, if it is determined at step S41 that the current enlargement ratio α is "same-size", the process proceeds to step S46, at which the low resolution image data is rotated. Then at step S47, it is determined whether or not resizing is required. If the rotation angle is 90° or 270°, resizing to 360×480 pixels is required. If resizing is not required, the rotated low resolution image data (image data of 640×480 pixels) is transferred to the image display memory 24 and is displayed. Further, if it is determined that resizing is required, the resize processing is performed at step S48, and the resized data is transferred and is displayed at step S49. In any case, the process returns to step S9 in FIG. 5.

As described above, according to the present embodiment, in the reproduction mode, low resolution image data corresponding to the display capability of the image display unit 28 and high resolution image data with the original size are generated based on coded image data stored in the recording medium, and the low resolution image data is displayed in the initial stage. In this arrangement, in frequently-utilized frame advance and frame reverse operations, the entire image can be displayed in a comparatively quick manner. Further, if a rotation request is made in an enlarged state, the high resolution image data is rotated. It takes time before the rotated image is displayed, however, as scrolling and enlargement/compression after the rotation can be performed using the rotated high resolution image data, the display can be quickly updated in the scrolling and enlargement/compression display.

Note that in the above embodiment, in the reproduction mode, the low resolution image data the high resolution image data as 2 intermediate data are generated upon decoding of compressed code image data. However, it may be arranged such that at normal reproduction times, only low resolution image data is generated and high resolution image data is generated when an enlargement request has been made. In this case, access to the recording medium is independently made upon generation of each intermediate data. When high resolution image data is generated and displayed, the response is degraded due to the increment in access time. Accordingly, it is preferable to generate 2 intermediate data with 1 access to the recording medium as in the case of the above embodiment.

Further, the high resolution image data has a reproducible maximum resolution, however, in use of image sensing device with image sensing capability of e.g. 10,000,000 pixels, the load of rotation processing is further increased. Accordingly, the upper limit of the resolution may be set.

Further, in the present embodiment, the processing has been described in the reproduction mode, however, the digital camera of the present embodiment has a function of, in the image sensing mode, displaying an image obtained by image sensing for checking for a predetermined period immediately after full-depression of the shutter button 311 and storage of image in the recording medium 200 or the like, then if no request has been inputted, moving to an image-sensing ready state, wherein if an enlargement and/or rotation request has been inputted during the display of image, performing enlargement/compression and/or rotation regardless of time, and returning to the image-sensing ready state (quick review function). In this situation, processing similar to the above-described processing may be performed upon display of image obtained by image sensing.

Further, in the present embodiment, the image sensing device 14 has a display capability of 5,000,000 pixels and the image display unit 28 has a display capability of 640×480 pixels, however, the present invention is not limited to these sizes. Further, the size of low resolution image data generated as intermediate data is the same as that of the image display unit, however, the present invention is not limited to this relation. For example, even though the image display unit 28 has the display capability of 640×480 pixels, if an area to display various menu items is ensured, an area for image display becomes smaller than 640×480. It is apparent that in this situation, the low resolution image data may be generated in correspondence with the image display area.

Further, the recording media 200 and 210 may comprise a micro DAT, a magneto-optical disk, an optical disk such as a CD-R or a CD-WR, a phase-change type optical disk such as a DVD, as well as a memory card such as a PCMCIA card or a compact flash, and a hard disk.

Further, the recording media 200 and 210 may comprise a complex medium where a memory card is integral with a hard disk or the like. Further, a part of the complex medium may be removable from the medium.

In the present embodiment, the recording media 200 and 210 are separately provided from the image processing apparatus 100 and are arbitrarily connectable to the apparatus, however, one or both of the media may be fixed to the image processing apparatus 100.

Further, it may be arranged such that an arbitrary number of recording media 200 or 210 are connectable to the image processing apparatus 100.

The number of recording media 200 and 210 attached to the image processing apparatus 100 may be single or plural or combination thereof. Further, in the present embodiment, upon reproduction, high resolution image data (large sized image data) and low resolution image data (small sized image data) are generated, however, generally, in a digital camera, one of prepared resolutions is selected and image sensing and recording are performed. If a resolution of 640×480 pixels is designated as an image sensing resolution, high resolution image data of the present embodiment is not generated. Accordingly, upon decoding, the file header is checked, and if the resolution of image sensing is lower than a predetermined resolution (e.g., 640×480 pixels), a high resolution image is not generated. In other words, a maximum resolution image is generated if the resolution is higher than the predetermined resolution.

Second Embodiment

In the first embodiment, 2 intermediate data, i.e., low resolution image data corresponding to the size of display area and high resolution image data having original resolution of a JPEG image file, are generated from coded image data (JPEG image file).

As described above, rotation processing requires much time. That is, as the size of image data to be rotated is smaller, time required for rotation processing is shorter.

In the second embodiment, in the initial stage of display of image obtained by image sensing, 3 or more intermediate data in different resolutions are generated. For the sake of simplification of explanation, as in the case of the first embodiment, the image sensing device 14 has a display capability of 5,000,000 pixels and can obtain image data of 2592×1944 pixels.

As intermediate data, 640×480 pixel image data (hereinbelow, low resolution image data), 1296×972 pixel image data (hereinbelow, intermediate resolution image data), and 2592×1944 pixel image data (hereinbelow, high resolution image data) are generated.

FIG. 10 is an explanatory view showing the outline of processing to generate these intermediate data. As shown in FIG. 10, a JPEG file is read from the recording medium 200 or 210, then an original image of 2592×1944 pixels (high resolution image data) 1000 is generated by JPEG decompression (decoding) processing. Then an intermediate resolution image data 1001 of 1296×972 pixels is generated by resizing the original image data 1000, and a low resolution image data 1002 of 640×480 pixels is generated by resizing the intermediate resolution image data 1001. The low resolution image data may be generated from the high resolution image data, however, as the number of pixels of the intermediate resolution data is smaller than that of the high resolution image data, the generation of low resolution image data from the intermediate resolution data is more preferable since the processing is simplified and the processing speed is more advantageous.

Then, in the initial status, the low resolution image data 1001 of 640×480 pixels is transferred to the image display memory 24, and is displayed on the image display unit 28.

In this situation, when request of next image display (frame advance request) is made, the above-described processing is repeated. Note that the previously-generated 3 intermediate data are deleted or data is overwritten on the data.

As the enlargement ratio α, if 1<α≦2 holds, the intermediate resolution image data 1001 is used as a display image. This processing will be described with reference to FIG. 11.

First, a cut out area 1001a is determined based on the enlargement ratio α (1<α≦2) and the enlargement central position at that time. Then a display image 1003 of 640×480 pixels is generated by resize processing the data in the cut out area. The display image 1003 is transferred to the image display memory 24 and is displayed on the image display unit 28. Note upon reception of scroll request, the cut out area 1001a in FIG. 11 is moved by a predetermined number of pixels in a designated direction.

Figure 11:
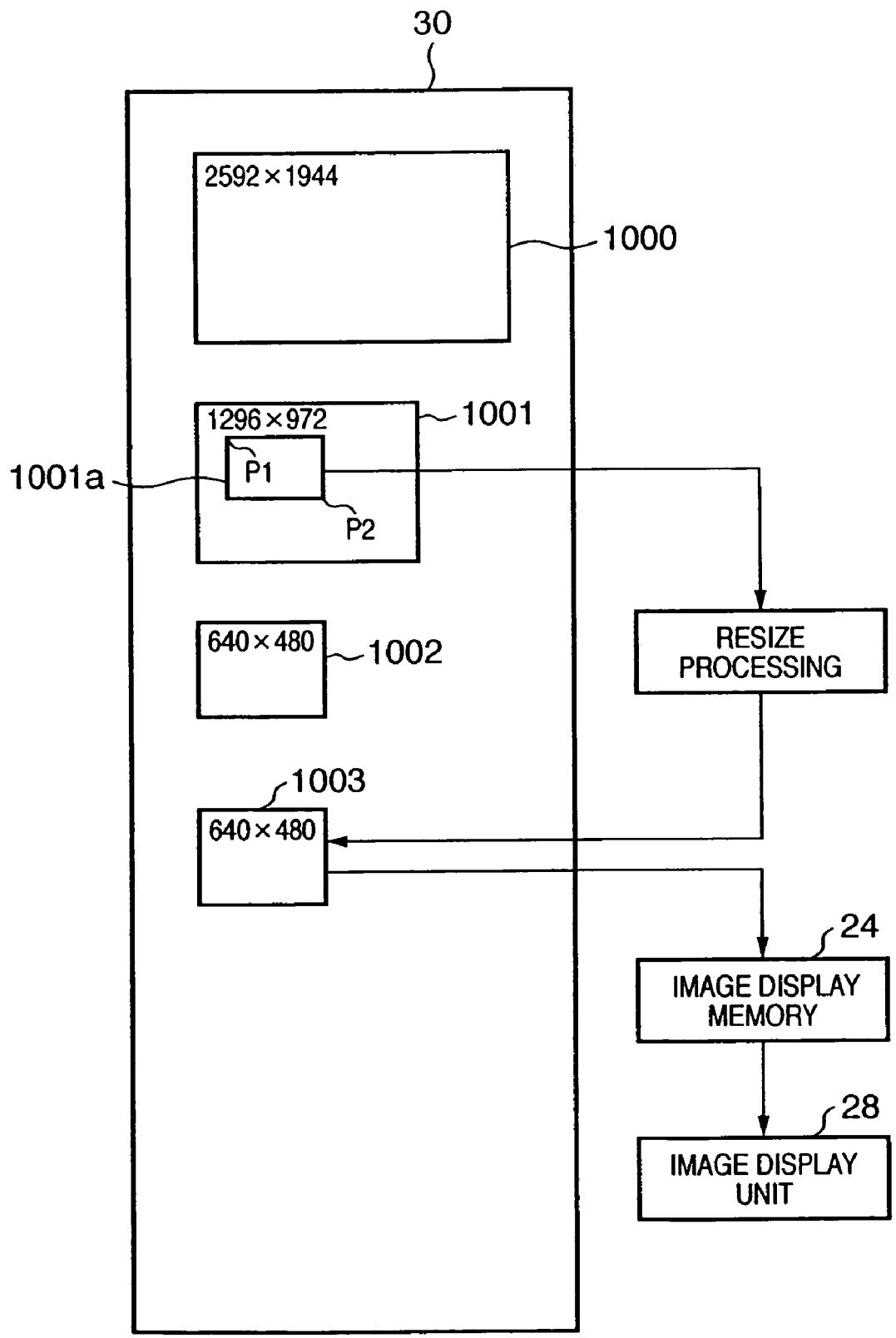
FIG. 11 is an explanatory view showing display processing in a case where, as a enlargement ratio α, 1<α≦2 holds, according to the second embodiment.

In FIG. 11, 1<α≦2 holds as the enlargement ratio α. In a case where 2<α≦4 holds, as the object of cutting out is merely changed to the high resolution image data 1000, the explanation of the processing will be omitted.

Figure 12:
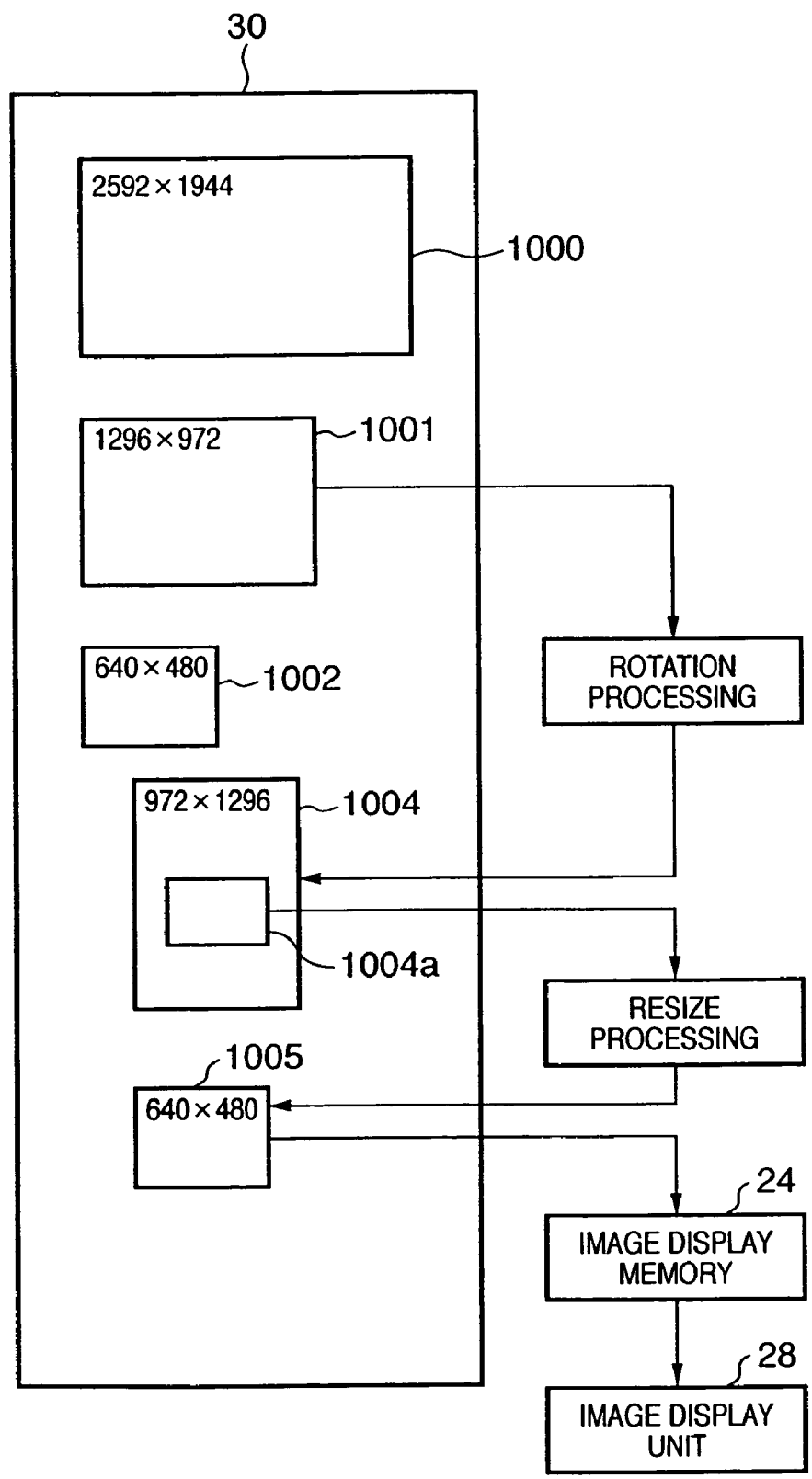
FIG. 12 is an explanatory view showing the rotation processing in a case where, as the enlargement ratio α, 1<α≦2 holds, according to the second embodiment.

Further, in a case where a rotation request is received when 1<α≦2 holds as the enlargement ratio α, as shown in FIG. 12, the intermediate resolution image data 1001 is rotate-processed and thereby rotated image data 1004 is generated (at this time, if the capacity of the memory 30 is insufficient, the intermediate resolution image data 1001 before the rotation may be deleted). Then image data in a cut out area 1004a (determined with the enlargement central position Q and the enlargement ratio) in the rotated intermediate resolution image data 1004 is resized and thereby a display image 1005 of 640×480 pixels is generated. The display image 1005 is transferred to the image display memory 24 and is displayed on the image display unit 28. In FIG. 12, in a case where the user has requested scrolling, as the rotation processing is not necessary, the position of the cut out area 1004a is merely moved in a designated direction. Further, in a case where 2<α≦4 holds as the enlargement ratio α, if a rotation request is made, the object of rotation processing is merely changed to the high resolution image data 1000, and processing thereafter is the same as shown in FIG. 12.

As described above, when the enlargement ratio α is increased by 1 step (1.25 times since Δα=0.25 holds in the present embodiment) from the initial stage (in the status where the low resolution image data 1002 is displayed), the cutting is made from the intermediate resolution image data 1001, and the rotation processing is made by using the intermediate resolution image data. That is, as long as the enlargement ratio α is within the range of 1<α≦2, as the number of pixels is ¼ of the maximum resolution, the response can be improved in comparison with the first embodiment. Further, as the number of pixels to be referred in the resize processing after the cutting out is smaller in comparison with the high resolution image data, the processing speed is higher.

As a result, according to the second embodiment, in the field of image sensing apparatus such as a digital camera, in which the number of image sensing pixels will be further increased, sufficient response can be ensured in a frame advance (and frame reverse) operation, which is made with higher frequency in comparison with an enlargement/compression operation, a scroll operation and a rotation operation. Further, extreme degradation of response can be suppressed in a rotation request in a comparatively low enlargement ratio. Thus an excellent operation environment can be provided to the user.

Note that in the above embodiment, 3 intermediate data area generated, however, the number of intermediate data may be 4 or more.

Further, generally, in digital cameras, the resolution of image obtained by image sensing is not limited to the resolution of image sensing device. In some cameras, one of resolutions lower than the resolution of the image sensing device is selected for image sensing. In such apparatus, since the image size as a result of decoding is detected by checking a compressed code file, the number of intermediate image data to be generated may be dynamically determined in correspondence with the image size.

Further, a program corresponding to the processing in the embodiments may be executed by an information processing apparatus such as a personal computer.

As described above, according to the present invention, in the initial stage of display of image obtained by image sensing, first-resolution image data depending on an image display area of display means is displayed, thereby a high response to a request for next image display or the like can be maintained. Further, in a case where a request with enlargement ratio higher than that of the initial stage is made, an image is generated based on high resolution image data, and the generated image is displayed on the display means. Thus the user's request for enlarged display or the like can be addressed.

Further, when image data is displayed on the display means in consideration of the attitude of image sensing apparatus upon image sensing, if there is no enlargement request, rotation processing is made based on the first-resolution image data and then display is made. As the processing time is shorter than the rotation processing based on second-resolution image data, the user can check an image obtained by image sensing more quickly.

The present invention is not limited to the above embodiments and various changes and modifications can be made within the spirit and scope of the present invention. Therefore, to appraise the public of the scope of the present invention, the following claims are made.

What is claimed is:

1. A display control apparatus for displaying an image, said apparatus comprising:
   a reading unit configured to read encoded image data from a storage medium;
   a generating unit configured to decode the encoded image data read by the reading unit and to generate first image data and second image data from the decoded image data, where the first image data has a number of pixels corresponding to a resolution of a display area of a display and the second image data has a number of pixels larger than that of the first image data;
   a storage unit configured to temporarily store the first image data and the second image data generated by said generating unit;
   a designation unit configured to designate a rotation of the image displayed in the display area;
   a determination unit configured to determine whether or not a current enlargement ratio for displaying an image is larger than the enlargement ratio in an initial stage;
   a rotation control unit configured to execute rotation processing of the first image data stored in the storage unit if the designation unit designates the rotation and the current enlargement ratio is not larger than that of the initial stage, and to execute rotation processing of the second image data stored in the storage unit if the designation unit designates the rotation and the current enlargement ratio is larger than that of initial stage;
   a display control unit configured to control the display to display an image based on the first image data temporarily stored in the storage unit on the display area if the current enlargement ratio is not larger than the enlargement ratio in the initial stage, and to control the display to display a partial image, which is obtained by cutting out from the second image data temporarily stored in the storage unit, on the display area if the current enlargement ratio is larger than the enlargement ratio in the initial stage.

2. The apparatus according to claim 1, further comprising a selection determination unit configured to determine whether or not a selection request to change an image to be displayed has been made,
   wherein, when said selection determination unit determines that the selection request to change an image to be displayed has been made, said generating unit decodes another encoded image data and generates first image data and second image data from the decoded image data.

3. The apparatus according to claim 1, further comprising:
   a detection unit configured to, referring to additional information added into encoded image data of an image to be displayed, detect an attitude of an image sensing device when an image sensing device has sensed the image to be displayed,
   wherein said designation unit automatically designates a rotation of the image in accordance with the attitude detected by said detection unit.

4. The apparatus according to claim 1, wherein, when an instruction of enlargement is inputted while an image based on the first image data is displayed on the display area, said rotation control unit executes the rotation processing of the second image data in accordance with the instruction, and said display control unit controls the display to display a partial image, which is obtained by cutting out from the rotated second image data in accordance with the enlargement ratio determined by said determination unit, on the display area.

5. The apparatus according to claim 1, further comprising:
   a scroll determination unit configured to determine whether or not a scroll instruction has been made, and
   wherein said display control unit invalidates the scroll instruction determined by said scroll determination unit when the current enlargement ratio is the same as the enlargement ratio in the initial stage, while when the current enlargement ratio is larger than that in the initial stage, controls the display to display a partial image according to the current enlargement ratio, where the partial image is obtained by cutting out from the second image data in accordance with the scroll instruction determined by said scroll determination unit.

6. A display control method for displaying an image, said method comprising:
   a reading step of reading encoded image data from a storage medium;
   a generating step of decoding the encoded image data read by said reading step and generating first image data and second image data from the decoded image data, where the first image data has a number of pixels corresponding to a resolution of a display area of a display and the second image data has a number of pixels larger than that of the first image data;
   a storage step of temporarily storing the first image data and the second image data generated by said generating step;
   a designation step of designating a rotation of the image displayed in the display area;
   a determination step of determining whether or not a current enlargement ratio for displaying an image is larger than the enlargement ratio in an initial stage;
   a rotation control step of executing rotation processing of the first image data stored in the storage step if the designation step designates the rotation and the current enlargement ratio is not larger than that of the initial stage, and executing rotation processing of the second image data stored in the storage step if the designation step designates the rotation and the current enlargement ratio is larger than that of initial stage; and
   a display control step of controlling the display to display an image based on the first image data temporarily stored in the storage step on the display area if the current enlargement ratio is not larger the enlargement ratio in the initial stage, and controlling the display to display a partial image, which is obtained by cutting out from the second image data temporarily stored in the storage step, on the display area, if the current enlargement ratio is larger than the enlargement ratio in the initial stage.

7. The method according to claim 6, further comprising a selection determination step of determining whether or not a selection request to change an image to be displayed has been made,
   wherein, when said selection determination step determines that the selection request to change an image to be displayed has been made, said generating step decodes another encoded image data and generates first image data and second image data from the decoded image data.

8. The method according to claim 6, further comprising
a detection step, referring to additional information added into encoded image data of an image to be displayed, of detecting an attitude of an image sensing device when the image sensing device has sensed the image to be displayed,
wherein said designation step automatically designates a rotation of the image in accordance with the attitude detected by said detection step.

9. The method according to claim 6, wherein, when an instruction of enlargement is inputted while an image based on the first image data is displayed on the display area, said rotation control step executes the rotation processing of the second image data in accordance with the instruction, and said display control step controls the display to display a partial image, which is obtained by cutting out from the rotated second image data in accordance with the enlargement ratio determined by said determination step, on the display area.

10. The method according to claim 6, further comprising
a scroll determination step of determining whether or not a scroll instruction has been made,
wherein said display control step invalidates the scroll instruction determined by said scroll determination step when the current enlargement ratio is the same as the enlargement ratio in the initial stage, while, when the current enlargement ratio is larger than that of the initial stage, controls the display to display a partial image according to the current enlargement ratio, where the partial image is obtained by cutting out from the second image data in accordance with the scroll instruction determined by said scroll determination step.

11. A computer-readable storage medium encoded with a computer program for instructing a computer to perform a display control method for displaying an image, said display control method comprising:

a reading step of reading encoded image data from a storage medium;
a generating step of decoding the encoded image data read by said reading step and generating first image data and second image data from the decoded image data, where the first image data has a number of pixels corresponding to a resolution of a display area of a display and the second image data has a number of pixels larger than that of the first image data;
a storage step of temporarily storing the first image data and the second image data generated by said generating step;
a designation step of designating a rotation of the image displayed in the display area;
a determination step of determining whether or not a current enlargement ratio for displaying an image is larger than the enlargement ratio in an initial stage;
a rotation control step of executing rotation processing of the first image data stored in the storage step if the designation step designates the rotation and the current enlargement ratio is not larger than that of the initial stage, and executing rotation processing of the second image data stored in the storage step if the designation step designates the rotation and the current enlargement ratio is larger than that of initial stage; and
a display control step of controlling the display to display an image based on the first image data temporarily stored in the storage step on the display area if the current enlargement ratio is not larger than the enlargement ratio in the initial stage, and controlling the display to display a partial image, which is obtained by cutting out from the second image data temporarily stored in the storage step, on the display area, if the current enlargement ratio is larger than the enlargement ratio in the initial stage.

* * * * *